United States Patent [19]

Akao et al.

[11] Patent Number: 4,981,734

[45] Date of Patent: Jan. 1, 1991

[54] PACKAGING MATERIALS

[75] Inventors: Mutsuo Akao; Koji Inoue, both of Kanagawa, Japan

[73] Assignee: Fuji Photo Film Co., Ltd., Minami-Ashigara, Japan

[21] Appl. No.: 218,908

[22] Filed: Jul. 14, 1988

[30] Foreign Application Priority Data

| Jul. 17, 1987 | [JP] | Japan | 62-177303 |
| Oct. 26, 1987 | [JP] | Japan | 62-268227 |
| Nov. 20, 1987 | [JP] | Japan | 62-291947 |
| Jan. 14, 1988 | [JP] | Japan | 63-6063 |
| Jan. 18, 1988 | [JP] | Japan | 63-6940 |
| Jan. 18, 1988 | [JP] | Japan | 63-6941 |

[51] Int. Cl.$^5$ ............................................. B24D 22/00
[52] U.S. Cl. ................................. 428/35.9; 428/349; 428/467; 428/516
[58] Field of Search ............... 428/516, 349, 461, 35, 428/35.9; 156/244.11

[56] References Cited

U.S. PATENT DOCUMENTS

| 4,147,291 | 4/1979 | Akao et al. |
| 4,258,848 | 3/1981 | Akao et al. |
| 4,331,725 | 5/1982 | Akao . |
| 4,337,285 | 6/1982 | Akao et al. |
| 4,356,224 | 10/1982 | Akao et al. |
| 4,359,499 | 11/1982 | Akao et al. |
| 4,386,124 | 5/1983 | Akao . |
| 4,411,943 | 10/1983 | Akao . |
| 4,411,945 | 10/1983 | Akao et al. |
| 4,436,809 | 3/1984 | Akao et al. |
| 4,452,846 | 6/1984 | Akao . |
| 4,469,741 | 9/1984 | Akao . |
| 4,513,050 | 4/1985 | Akao . |
| 4,565,733 | 1/1986 | Akao . |
| 4,565,743 | 1/1986 | Akao . |
| 4,576,865 | 3/1986 | Akao . |
| 4,579,781 | 4/1986 | Akao . |
| 4,584,234 | 4/1986 | Hirose et al. |
| 4,587,175 | 5/1986 | Akao . |
| 4,629,640 | 12/1986 | Akao . |
| 4,639,386 | 1/1987 | Akao . |
| 4,643,943 | 2/1987 | Schoenberg ............... 428/516 |
| 4,653,640 | 3/1987 | Akao . |
| 4,661,395 | 4/1987 | Akao . |
| 4,661,401 | 4/1987 | Akao . |
| 4,663,218 | 5/1987 | Akao . |
| 4,687,692 | 8/1987 | Akao . |
| 4,708,896 | 11/1987 | Akao . |
| 4,730,778 | 3/1988 | Akao et al. |
| 4,778,712 | 10/1988 | Akao ........................ 428/516 |
| 4,780,357 | 10/1988 | Akao ........................ 428/516 |
| 4,876,129 | 10/1989 | Akao ........................ 428/349 |

FOREIGN PATENT DOCUMENTS 2123747 2/1984 United Kingdom .

OTHER PUBLICATIONS

Database WPIL, No. 85-155, 295, Derwent Publications Ltd., London, GB.
Abstract JP-A-60-085946 (Showa Denko K. K.) 15-05-1985.
DATABASE WPIL, No 83-08, 385, Derwent Publications Ltd., Londong, GB.
Abstract JP-A-57-201626 (Idemitsu Petrochem. K. K.) 10-12-1982).

Primary Examiner—Edith Buffalow
Attorney, Agent, or Firm—Burns, Doane, Swecker & Mathis

[57] ABSTRACT

In the packaging materials of the invention, a pair of inflation film layers is joined to each other by blocking in a flexible state to some degree without using adhesive. Therefore, they are not always joined completely integrally, and little space remains between the inflation film layers. The space can be increased by controlling the properties of the inflation film layers, blocking conditions and the like. By this pseudo-adhesion, physical strength such as tear strength is improved, buffer action is imparted, and curling is prevented.

15 Claims, 2 Drawing Sheets

PACKAGING MATERIALS

BACKGROUND OF THE INVENTION

1. Field of the Invention

This invention relates to packaging materials suitable for various photographic photosensitive materials, light-sensitive materials and electronic parts, particularly for relatively heavy materials among them, such as a roll film for movie.

2. Description of the Prior Art

As a packaging material for photographic photosensitive materials, it is necessary to have various properties including gas barrier, moistureproofness, antistatic property, rigidity, physical strength such as breaking strength, tear strength, impact puncture strength, Gelbo test strength and wear resistance, heat sealing properties such as heat seal strength, cut-seal ability, hot tack properties (hot-seal ability) and seal ability of contrasting materials, flatness, slipping character, low dusting characteristics, and the like. Generally, it is difficult to satisfy these properties by a single material. Therefore, the packaging material is usually composed of two or more layers. As the packaging material for rolls or sheets of photographic photosensitive materials, the inventor has already disclosed a packaging material of which physical strength is raised by combining two uniaxially stretched film layer (U.S. Pat. No. 4,331,725). Another packaging material suitable for heavy photosensitive materials is a triple layer laminated film composed of a foamed sheet and two uniaxially stretched thermoplastic resin films laminated on both sides thereof (U.S. Pat. No. 4,565,733). The thickness of the foamed sheet is 0.3 to 2 mm, and the expansion ratio is 5 to 50 times. Two uniaxially stretched films are bonded directly by heating or through an adhesive layer coated by hot melt coating so that respective molecular orientation axes cross with each other at an angle more than 30 degrees. The laminated film is compressed to 40 to 85% of the sum of respective layers. The triple layer laminated film is excellent in impact puncture strength and Gelbo test strength, and exhibits only a slight tendency to curl.

Since respective film layers are laminated by extrusion or using adhesive layer in the above packaging materials, they are curled and stiffened due to the lamination. Besides, when laminated films have a coextruded T die film or inflation film, a substantial amount of trimming loss occurs.

SUMMARY OF THE INVENTION

An object of the invention is to provide packaging materials suitable for photosensitive materials excellent in physical strength particularly tear strength and impact puncture strength and appearance, being soft and hardly curled.

Another object of the invention is to provide packaging materials of which the trimming loss is low in the inflation film mold process and in the lamination process.

Another object of the invention is to provide packaging materials wherein it is not necessary to incorporate an adhesive layer for lamination.

Another object of the invention is to provide packaging materials of which the right side and the reverse side can be found readily under a safety light in a dark room where packaging is carried out.

Another object of the invention is to provide packaging materials excellent in the prevention of temperature elevation under sunlight.

The present invention provides packaging materials achieving such objects, which comprises a pair of inflation film layers disposed symmetrically and joined through a pseudo-adhesive portion formed by blocking thereof.

The present invention also provides packaging materials which comprises a pair of inflation film layers disposed symmetrically and joined through a pseudo-adhesive portion formed by blocking thereof, and a light-reflective flexible sheet layer.

DETAILED DESCRIPTION OF THE INVENTION

Figure 1:
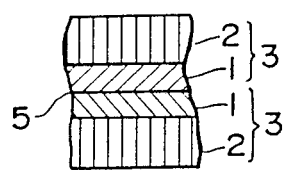
FIGS. 1 to 7 are partially sectional views of preferred embodiments not having a light-reflective flexible sheet layer of the invention.

The layer to be blocked of the inflation film layer is preferably linear low density polyethylene (L-LDPE) resin film layer, ethylene-acrylate ester copolymer resin film layer or ethylene-vinyl acetate copolymer resin film layer.

The density of the L-LDPE resin is less than 0.925 g/cm$^3$, preferably less than 0.90 g/cm$^3$. When the density is beyond 0.925 g/cm$^3$, the adhesive strength formed by blocking is weak, even though the temperature of molten resin is raised. Therefore, the pseudo-adhesive portion is readily separated. The Vicat softening point of the L-LDPE resin is preferably lower than 110° C. The content of the L-LDPE resin in the film layer is preferably more than 20% by weight, further preferably more than 50% by weight. The L-LDPE resin film layer may contain other resins. Suitable other resins are EEA resin, EMA resin, LDPE resin, EAA resin, terpene resin, paraffin wax, petroleum resin, cumarone indene resin, various elastomers, etc. The L-LDPE resin film layer preferably contains 0.01 to 2% by weight of an antioxidant, and suitable antioxidants are phenol antioxidants, sulfur-containing antioxidants, phosphorus-containing antioxidants and the like. The phenol antioxidants include n-octadecyl-3-(3',5'-di-t-butyl-4'-hydroxyphenyl)propionate, 2,6-di-t-butyl-4-methylphenol, 2,6-di-t-butyl-p-cresol (BHT), 2,2'-methylenebis(4-methyl-6-t-butylphenol), 4,4'-thiobis(3 methyl-6-t-butylphenol), 4,4'-butylidenebis(3-methyl-6-t-butylphenol), stearyl-β-(3,5-di-4-butyl-4-hydroxyphenyl)propionate, b 1,1,3-tris(2-methyl-4-hydroxy-5-t-butylphenyl)butane, 1,3,5-trimethyl-2,4,6-tris(3,5-di-t-butyl-4-hydroxybenzyl) benzene and tetrakis methylene 3(3',5'-di-t-butyl-4'-hydroxyphenyl)propionate methane. The sulfur-containing oxidation inhibitors include dilauryl-3,3'-thiodipropionate, dimyristyl-3,3'-thiodipropionate, laurylstearylthiodipropionate, distearyl-3,3'-thiodipropionate and ditridecyl-3,3'-thiodipropionate. The phosphorus-containing antioxidants include trinonylphenylphosphite and triphenylphosphite. Particularly effective antioxidants are BHT, low volatile high molecular weight phenol antioxidants ("Irganox 1010", "Irganox 1076", trade names of Ciba-Geigy A.G., "Topanol CA", trade name of I.C.I., etc.), dilaurylthiodipropionate, distearylthiodipropionate, dialkylphosphate, etc. Two or more antioxidants may be combined. An antiblocking agent is usually not added to the L-LDPE resin film layer.

The ethylene acrylate ester copolymer resin includes ethylene-methylacrylate copolymer resin and ethylene-ethylacrylate copolymer resin. The content of acrylate ester unit, such as methylacrylate unit and ethylacrylate unit, is more than 7% by weight, preferably 7 to 30% by weight. When the content of acrylate ester unit is less than 7% by weight, it is difficult to generate blocking. It is inferior in softness, and wrinkling and furrowing are liable to occur. The physical strength is low, and the antistatic property is insufficient. The ethylene-acrylate ester copolymer resin content of the ethylene-acrylate ester copolymer resin film layer is preferably more than 50% by weight. When the content is less than 50% by weight, the film layer is inferior in softness, and the adhesive strength formed by blocking is weak. Therefore, the pseudo-adhesive portion is readily separated. The physical strength is low, and the antistatic property is insufficient. The ethylene-acrylate ester copolymer resin film layer may contain other resins. Suitable other resins are L-LDPE resin, LDPE resin, EAA resin, terpene resin, paraffin wax, cumarone indene resin, various elastomers, etc. The ethylene-acrylate ester copolymer resin film layer preferably contains 0.01 to 2% by weight of an antioxidant, and the antioxidant may be selected from described previously. When the content is less than 0.01% by weight, oxidation inhibition is insufficient. The generation of the lumps of antioxidant increases due to the oxidation of resin, and the lumps cause pressure marks on the photographic photosensitive materials packaged therein. While, when the content is beyond 2% by weight, the antioxidant adversely affects the photographic photosensitive materials utilizing an oxidation-reduction reaction. The antioxidant gradually bleeds out. An antiblocking agent is usually not added to the ethylene-acrylate ester copolymer resin film layer.

The vinyl acetate unit content of the ethylene-vinyl acetate copolymer resin is more than 5% by weight, preferably 5 to 35% by weight. When the content is less than 5% by weight, it is difficult to generate blocking. The adhesive strength formed by blocking is weak, and the pseudo-adhesive portion is readily separated during bag-making, etc. The ethylene-vinyl acetate copolymer resin content of the film layer is preferably more than 50% by weight. When the content is less than 50% by weight, the film layer is inferior in softness, and the adhesive strength formed by blocking is weak. Therefore, the pseudo-adhesive portion is readily separated. The ethylene-vinyl acetate copolymer resin film layer may contain other resins. Suitable other resins are L-LDPE resin, LDPE resin, EMA resin, EEA resin, EAA resin, terpene resin, paraffin wax, petroleum resin, cumarone indene resin, various elastomers, etc. An antiblocking agent is usually not added to the ethylene-vinyl acetate copolymer resin film layer.

The thickness of the inflation film layer is usually 15 to 200 μm, particularly 20 to 100 μm, in the case of a coextruded multilayer film layer.

The inflation film layers are molded by the inflation process, and the inside of the molded tubular film is joined through a pseudo-adhesive portion formed by blocking. That is, the inflation film layers are symmetrically joined without using an adhesive. In the packaging material of the invention, it is sufficient that the inner layers of the inflation film layers are joined by the pseudo-adhesion formed by blocking, and the blocking area is preferably more than 50%, further preferably more than 95%, in view of the prevention of wrinkling, thickening, laminating ability, lay-making ability and the like. They are joined in a flexible state, and the adhesive strength may be in the range from the lightly joined state to the maximum heat strength in the case that the inflation films are joined by heat seal at a suitable temperature. Preferable adhesive strength is 0.01 to 1000 g/15 mm width, and particularly preferable adhesive strength is 0.1 to 300 g/15 mm width, when it is measured according to the testing method of delamination resistance described in U.S. Pat. No. 4,708,896. When the blocking is too weak, the inflation films separate during various processes, and wrinkling, thickening, slippage or the lie occurs. While, the blocking strength is too great, the laminated film formed by blocking becomes like a single layer film, physical strength is lowered. The laminated film becomes stiff, and bursting strength decreases. Therefore, the resin composition of the inner layer may be sufficient to satisfy the above characteristics. Preferably the resin composition contains one or more resins selected from low density polyethylene resin including L-LDPE resin and LDPE resin having a density of less than 0.925 g/cm$^3$ and a Vicat softening point of lower than 110° C., ethylene-acrylate ester copolymer resin having a comonomer content of more than 7% by weight, ethylene-vinyl acetate copolymer resin having a comonomer content of 5% by weight, EEA resin, terpene resin, paraffin wax, petroleum resin, cumarone indene resin and various elastomers. In the case of the above resin composition, an antiblocking agent may be incorporated. However, in order to make the blocking completely, the antiblocking agent is preferably not incorporated. The pseudo-adhesive portion may contain space, and in this case, buffer action can be obtained by the space.

The blocking is made to occur by passing the take-up nip roll or a pressure roll newly incorporated before and/or after the nip roll or the like. The occurrence and adjustment of the strength of pseudo-adhesion is made by selecting the kind of resin, the density, the Vicat softening point and other properties, particularly the density, of the resin, additives, particularly a decrease in or absence of antiblocking agent, temperature relations, such as molten resin temperature, the temperature of cooling medium such as blown air or water, and room temperature, the length between the round die and the blocking part, nipping pressure, heating roll pressure, and the like.

The inflation film layer is, in general, a coextruded multilayer film layer in order to prevent the blocking on the outside of the inflation film layer. A preferable outer layer is the heat-sealable thermoplastic resin film layer containing more than 10% by weight of an ethylene copolymer resin, a light-shielding material and a lubricant. Moreover, it is preferable to incorporate more than 0.5% by weight of polyethylene resin having a density of 0.940 g/cm$^3$ in the resin composition of the outer layer because blocking can be prevented without antiblocking agent. The softening point, Young's modulus, wear resistance, etc. can also be improved. The Vicat softening point of the outer layer is higher than the inner layer to be blocked by 5° C. or more, and the slip angle of the outer layer is preferably 6 to 60 degrees.

The ethylene copolymer resin includes ethylene propylene copolymer resin, L-LDPE resin, ethylene-ethylacrylate copolymer resin, ethylene-methylacrylate copolymer resin, ethylene-vinyl acetate copolymer resin, ethylene acrylic acid copolymer resin, and the like. The ethylene copolymer resin content of the thermoplastic resin film layer is more than 10% by weight, preferably 10 to 99% by weight. In the case of less than 10% by weight, when the content of a light-shielding material and a lubricant is high, delamination resistance is small, and physical strength remarkably decreases. The thermoplastic resin film layer may contain other resins. Suitable other resins are various polyethylene resins, various polypropylene resins, polyvinyl chloride resin, polyvinylidene chloride resin, various polyamide resins, polycarbonate resin, various polyester resins, modified polyolefin resins and blended resins thereof.

The light-shielding material includes every material capable of shielding visible, infrared and ultraviolet light. Examples of the light-shielding material are various carbon black, graphite, iron oxide, zinc white, titanium oxide, clay, aluminum powder, aluminum paste, calcium carbonate, mica, barium sulfate, talc, cadmium pigments, red iron oxide, cobalt blue, copperphthalocyanine pigments, monoazo and polyazo pigments and aniline black. Various carbon black, aluminum powder and aluminum paste from which volatile components are removed are preferred in view of light-shielding ability, quality, cost and the like. Among these, oil furnace carbon black having a mean particle size of smaller than 200 m$\mu$ is preferred in terms of light-shielding ability, cost and improvement of physical strength. On the other hand, since acetylene carbon black, Ketschen carbon black and graphite have antistatic character, they are also preferred, though they are expensive. They may be blended with the oil furnace carbon black in order to improve its character. Suitable pH of carbon black is at 5 to 9, and suitable mean particle size is 10 to 120 m$\mu$, particularly 10 to 50 m$\mu$. The oil furnace carbon black having pH 6 to 9 and mean particle size of smaller than 50 m$\mu$ is preferred. By using the carbon black of such pH and particle size, a packaging material having the following merits is obtained. That is, the occurrence of fogging is rare, increase or decrease of photosensitivity scarcely happens, light shielding ability is great, the lumps of carbon black and pinholes such as fish eyes hardly occur, and physical strength and heat sealing properties are improved. As the preferable light-shielding material, metal powder is in second place. Metal powder is a light-reflective light-shielding material. It imparts silver appearance being preferable, and it is excellent in moistureproofness, light-shielding, antistatic property, thermal shielding in the sunlight and gas barrier. As the metal powder, aluminum powder and its paste are preferable. The paste of aluminum powder is produced by adding mineral spirits and a small amount of a higher fatty acid such as stearic acid or oleic acid or a derivative thereof to form paste at the production of aluminum powder according to a known method such as using a ball mill, a stamp mill or an atomizer. A polyolefin thermoplastic resin, such as various polypropylene resins, various polyethylene resins, ethylene-vinyl acetate copolymer (EVA) resin, ethylene-ethyl acrylate copolymer (EEA) resin and ethylene-acrylic acid copolymer (EAA) resin, or another thermoplastic resin is kneaded together with this aluminum paste under heating, and volatile components mainly mineral spirits are removed by heating and/or a vacuum pump. This product is used as aluminum paste compound resin or aluminum paste masterbatch resin. The aluminum powder includes microflakes produced from aluminum foil which is crushed by a ball mill or a stamp mill, in addition to usual aluminum powder manufactured by atomization, dropping on a rotary disc or evaporation from melted aluminum. Since aluminum powder is unstable, it is stabilized by a known treatment, such as coating with a higher fatty acid, a derivative thereof or the like. The content of the light-shielding material is 0.5 to 50 g/m$^2$. The form of the light-shielding material prior to blending may be powder, paste, liquid, dye color granule, masterbatch pellets, etc. As the method of blending the light-shielding material, there are the masterbatch method, dye color granule method, the compound coloring method and the like. The light-shielding material may be added to other layers including the foregoing inner layer.

The lubricant is added in order to improve film moldability, slipping character, processibility, and the like. The lubricant may be selected from fatty acid amide lubricants such as oleic acid amide lubricants, erucic acid amide lubricants, stearic acid amide lubricants and bis fatty acid amide lubricants, silicone lubricants, alkylamine lubricants, fatty acid metallic salts, waxes, paraffins, fatty alcohols, glycerides, fatty acid lower alcohol esters, $\alpha$-olefin-maleic acid copolymers, and the like.

Examples of commercial lubricants suitable for the present invention include:

Oleic acid amide lubricants; "ARMOSLIP-CP" (Lion akzo Co., Ltd.), "NEWTRON" and "NEWTRON E-18" (Nippon Fine Chemical Co., Ltd.), "AMIDE-0" (Nitto Kagaku K.K.), "DIAMID 0-200" and "DIAMID G-200" (Nippon Kasei Chemical Co., Ltd.), "ALFLOW E-10" (Nippon Oil and Fats Co., Ltd.), etc.

Erucic acid amide lubricants; "ALFLOW P-10" (Nippon Oil and Fats Co., Ltd.), "NEWTRON S" (Nippon Fine Chemical Co., Ltd.), etc.

Stearic acid amide lubricants; "ALFLOW S-10" (Nippon Oil and Fats Co., Ltd.), "NEWTRON 2" (Nippon Fine Chemical Co., Ltd.), "DIAMID 200" (Nippon Kasei Chemical Co., Ltd.), etc.

Bis fatty acid amide lubricants; "BISAMIDE" (Nitto Kagaku K.K.), "DIAMID 200 BIS" (Nippon Kasei Chemical Co., Ltd.), "ARMOWAX-EBS" (Lion Akzo Co., Ltd.), etc.

Silicone lubricants; Dimethylpolysiloxanes, etc. (Sinetsu Chemical Co., Ltd., Toray Silicone Co., Ltd.), etc.

Alkylamine lubricants; "ELECTROSTRIPPER TS-2" (Kao Corp.) etc.

Preferable lubricants include the fatty acid amide lubricants having a number of carbon atoms of 8 to 50, preferably 15 to 35. Two or more lubricants may be combined. When the packaging material is used for photographic photosensitive materials, a suitable content of the lubricant is 0.01 to 1% by weight. The lubricant may be added to various layers.

The Vicat softening point (Testing method for Vicat softening temperature of thermoplastics ASTM D-1525) of the thermoplastic resin film layer is preferably higher than the inner layer to be blocked by 5° C. or more. By the difference of the softening points, the inner layers joined by pseudo-adhesion can sufficiently be melted at the heat seal portion, all layers are thus joined completely. The difference is also preferably in view of the occurrence of blocking.

The slip angle of the thermoplastic resin film layer is preferably 6 to 60 degrees in order to improve slipperiness and to prevent wrinkling during forming the inflation film, laminating to other film layers, bag-making, packaging and the like. The measuring procedure of the slip angle is described later. When the slip angle is less than 6 degrees, weaving occurs at the winding of the laminated film. Moreover, the laminated film cannot be stacked. While, when the slip angle is beyond 60 degrees, wrinkling or furrowing occurs during forming the inflation film. Various troubles happen during packaging process and other processes.

A substance having antiblocking activity (antiblocking substance) is preferably incorporated into the thermoplastic resin film layer. Such an antiblocking substance includes antiblocking agents, such as silica, diatomaceous earth, talc, calcium silicate, aluminum silicate, magnesium silicate, calcium carbonate, polyvinyl esters of higher fatty acid, n-octadecylurea, dicarboxylic acid ester amides and N,N'-dioleylhydroxyamido, and various lubricants and light-shielding materials having antiblocking activity. Preferable antiblocking substances are carbon black, fatty acid amides, silica, talc, calcium carbonate, metal powder, titanium dioxide and the like. When the antiblocking substance and the polyethylene resin having a density of more than 0.925 g/cm$^3$ is absent in the outer layer, blocking is liable to occur between the outer layers all over the roll of the inflation film of the invention during winding and temporary stock.

When the outer layer contains the antiblocking substance, the outer layer may be another thermoplastic resin film layer not containing ethylene copolymer resin, such as various polyethylene resin film layers, various polypropylene resin film layers, polyvinyl chloride resin film layer, polyvinylidene chloride resin film layer, various polyamide resin film layers, polycarbonate resin film layer, various polyester resin film layers, various their modified resin film layers or various their blended resin film layers.

The thickness of the thermoplastic resin film layer is usually 10 to 190 μm, particularly 20 to 100 μm. In the case of the laminated film formed by blocking, the thickness doubles.

The coextruded multilayer film layer may contain one or more intermediate layers. In the packaging material of the invention, since the outer layer is disposed on both sides, the inner layer and intermediate layers may contain harmful materials for the product to be packaged.

When a multilayer film is coextruded by a round die inflation molding machine, the laminating methods are divided broadly into three types, i.e. laminating in die type, laminating out of die type and laminar flow supply type. The laminating in die type is preferable because of strong delamination resistance.

Various flexible sheet layers may be laminated to the paired inflation film layers joined by the pseudo-adhesion. Such a flexible sheet includes uniaxially or biaxially molecularly oriented (including stretched) or unstretched various thermoplastic resin films such as various polyethylene resin films, various ethylene copolymer resin films, various polypropylene resin film, polyvinyl chloride resin film, polyvinylidene chloride resin film, various polyamide resin films, polycarbonate resin film, various polyester resin films, various their modified resin films and various their blended resin films, metallized films represented by aluminum vacuum-metallized film, cellulose acetate film, cellophane, polyvinyl alcohol film, various papers, various metal foils represented by aluminum foil, nonwoven fabric, and the like.

A particularly preferable flexible sheet layer to be laminated is a light-reflective flexible sheet layer disposed as the outer layer or at the position capable of looking from the outside. The light-reflective flexible sheet layer is composed of a metal foil layer, a metallized flexible sheet layer, a light-reflective light shielding thermoplastic resin film layer containing a light-reflective light-shielding material or a combination thereof. The metal foil is aluminum foil, tin foil, iron foil or the like, and the metallized flexible sheet is aluminum vacuum-metallized film, aluminum vacuum metallized paper, sputtering film or the like.

The thermoplastic resin of the light-reflective light-shielding thermoplastic resin film layer may be a polyolefin resin, a polyester resin, a polyamide resin or the like, and polyolefin resins are preferable. Particularly preferable resins are high density polyethylene (HDPE) resin, polypropylene resin, L-LDPE resin and blended resins containing one or more of these resins, being excellent in moistureproofness. The light-reflective light-shielding material is metal powder, white or light yellow pigment, or the like. The metal powder is aluminum powder, aluminum paste, tin powder, nickel powder, zinc powder, the powder of the alloy or compound thereof. The aluminum powder and aluminum paste may be the same as explained previously. A particularly preferable light-reflective light-shielding material is the aluminum powder completely coated with a higher fatty acid, a higher fatty acid derivative or a mixture thereof, which is prepared by blending 90 to 99.9% by weight of aluminum powder with 0.1 to 10% by weight of a higher fatty acid, a higher fatty acid derivative or a mixture thereof without using a solvent such as mineral spirit. The content of metal powder is usually 0.1 to 20% by weight, and 1 to 6% by weight is preferable.

The thickness of the light-reflective flexible sheet layer is more than 5 μm, preferably 8 to 80 μm, more preferably 10 to 50 μm in view of laminating ability.

The flexible sheet layer including the light-reflective flexible sheet layer may be laminated according to a known method such as a heat sealing (hot bar sealing, Verneuil's method, impulse heat sealing, supersonic heat sealing, etc.) or the method using an adhesive (wet laminating, dry laminating, hot melt laminating, extrusion laminating, etc.).

The adhesive is selected by considering both layers to be joined, and includes thermoplastic resin melting adhesives including a polyolefin adhesive, hot melt type gum adhesives and solution type adhesives. The polyolefin adhesives include a homopolymer and a copolymer of an olefin such as various polyethylenes, polypropylenes, polybutenes and ethylene-propylene copolymers and L-LDPE, a copolymer of an olefin and another monomer such as ethylene-vinyl acetate copolymer, ethylene-acrylate ester copolymer, various ionomers ("SURLYN" Dupont, "HIMIRAN" Mitsui Polychemicals Co., Ltd., etc.) and a graft copolymer. The solution type adhesives are divided into adhesives for wet lamination and adhesives for dry lamination T-M The adhesives for wet lamination are emulsion or latex. Examples of the emulsion-type adhesives are polyvinyl acetate emulsion, the emulsion of vinyl acetate-ethylene copolymer, the emulsion of vinyl acetate-acrylate ester copolymer, the emulsion of vinyl acetate-maleate ester copolymer, the emulsion of acrylic copolymer and the emulsion of ethylene-acrylic acid copolymer. Examples of the latex-type adhesives are natural rubber latex, styrene-butadiene rubber latex, acrylonitrile-butadiene rubber latex and chloroprene rubber latex. An example of the adhesives for dry lamination is polyurethane adhesive. Adhesives for hot melt lamination containing paraffin wax, microcrystalline wax, ethylene-vinyl acetate copolymer and ethylene-ethylacrylate copolymer, pressure-sensitive adhesives, temperature-sensitive adhesives and ultraviolet curing type adhesives may also be employed. Particularly preferable extrusion laminating adhesives are LDPE resin and L-LDPE resin due to their excellent laminating ability and inexpensiveness. Besides, a blend of resins of the foregoing resins for adhesive so as to compensate the defect of each resin is also particularly preferable.

The thickness of the adhesive layer formed by extrusion laminating using a thermoplastic resin is usually 6 to 50 μm, preferably 10 to 20 μm. However, the thickness is determined based upon cost, rate of application, thickness of the whole layers, and etc., and accordingly, the thickness is not limited to the above range.

The packaging material of the invention may be used for packaging photosensitive materials such as photographic photosensitive materials, foods, medicines or chemical substances, and it is particularly suitable for packaging silver halide photographic photosensitive materials, diazo photographic photosensitive materials, photosensitive resins, self-developing type photographic photosensitive materials and other photographic materials which are degraded by small amounts of moisture or gas.

The package form my be conventional and includes a single-sheet flat bag, a double-sheet flat bag, a self-standing bag, a single-sheet gusset bag, a double-sheet gusset bag, inner lining for a moisture proof box, inner lining for a light room-loading light-shielding box and a leader paper. The sealing form may also be conventional, and includes heat sealing, heat cut sealing, impulse heat sealing, supersonic sealing and high frequency sealing. The methods of using an adhesive may also be utilized.

In the packaging materials of the invention, a pair of inflation film layers is joined to each other by blocking in a flexible state to some degree without using adhesive. Therefore, they are not always joined completely integrally, and a little space remains between the inflation film layers. The space can be increased by controlling the properties of the inflation film layers, blocking conditions and the like. By this pseudo-adhesion, physical strength such as tear strength is improved, buffer action is imparted, and curling is prevented. The thermoplastic resin film layer improves film moldability and shields the order of the inner layer such as ethylene-acrylate ester resin film layer or ethylene-vinyl acetate resin film layer. The light-reflective flexible sheet layer improves printability, right-reverse judgement under safety light, and the prevention of high internal temperatures under sunlight.

The packaging materials of the invention are flexible and excellent in physical strength such as tear strength, Gelbo test strength, bursting strength and impact puncture strength. Curling does not occurs, and in the case of the pseudo-adhesion alone, the equipment for the adhesion using an adhesive is not necessary. Moreover, in the case of using the ethylene-acrylate ester copolymer resin film layers for the pseudo-adhesion, antistatic property is also improved, and undesirable order of the ethylene-acrylate ester copolymer resin can be shielded by the thermoplastic resin film layer. In the case of using the ethylene-vinylacetate copolymer resin film layers for the pseudo-adhesion, the problems of the EVA resin such as inferior moldability, the blocking in the case of winding the film, and undesirable order are also improved. By incorporating the light-reflective flexible sheet layer, antistatic property is also improved. Since the packaging materials of the invention are produced by joining the insides of inflation film, the edge trimming loss in the case of a conventional inflation film mold process and laminated films does not occur. Since the laminated film of the invention is produced by an inflation molding process, it can be efficiently utilized. Wrinkling and melt fracture hardly occur, and film moldability is good.

The packaging materials of the invention are characterized by the coextruded multilayer inflation film having a particular layer combination and an antiblocking substance incorporated into the outer layers, while antiblocking agent is excluded from the inner layers. Preferable embodiments of the packaging material of the invention include:

(1) A packaging material which comprises a pair of coextruded multilayer inflation film layers disposed, symmetrically each comprising a linear low density polyethylene resin film layer containing more than 50% by weight of linear low density polyethylene resin having a density of less than 0.925 g/cm$^3$ and 0.01 to 2% by weight of an antioxidant disposed on the inside joined through a pseudo-adhesive portion formed by blocking and a thermoplastic resin film layer containing a substance having antiblocking activity disposed on the outside.

(2) A packaging material which comprises the laminated film of the above embodiment (1) and a light-reflective flexible sheet layer.

(3) A packaging material which comprises a pair of coextruded multilayer inflation film layers disposed symmetrically each comprising an ethylene-acrylate ester copolymer resin film layer containing preferably more than 50% by weight of an ethylene-acrylate ester copolymer resin film layer. An ethylene-acrylate ester copolymer resin of which the content of methylacrylate unit, ethylacrylate unit or a mixture thereof is more than 7% by weight and 0.01 to 2% by weight of an antioxidant disposed on the inside joined through a pseudo-adhesive portion formed by blocking and a thermoplastic resin film layer containing a substance having antiblocking activity disposed on the outside.

(4) A packaging material of which comprises the laminated film of the above embodiment (3) and a light-reflective flexible sheet layer.

(5) A packaging material which comprises a pair of coextruded multilayer inflation film layers disposed symmetrically each comprising an ethylene-vinyl acetate copolymer resin film layer containing more than 35% by weight of ethylene-vinyl acetate copolymer resin of which the content of vinyl acetate unit is more than 5% by weight disposed on the inside joined through a pseudo-adhesive portion formed by blocking and a thermoplastic resin film layer containing a substance having antiblocking activity disposed on the outside.

(6) A packaging material which comprises the laminated film of the above embodiment (5) and a light-reflective flexible sheet layer.

Representative embodiments of the packaging materials of the invention are illustrated in FIGS. 1 to 14.

The packaging material of FIG. 1 is composed of a pair of coextruded multilayer inflation films 3,3 consisting of an inner layer 1 which is a-L LDPE resin film layer, an ethylene-acrylate ester copolymer resin film layer or an ethylene-vinyl acetate copolymer resin film layer and an outer layer 2 which is a thermoplastic resin film layer 2. The coextruded multilayer inflation film is molded by a double layer coextrusion inflation film molding machine using a round die. The inner layers 1,1 are joined to each other through the pseudo-adhesion portion 5 formed by blocking.

Figure 2:
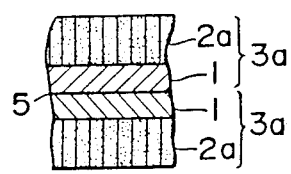

The packaging material of FIG. 2 is the same as the packaging material of FIG. 1, except that the thermoplastic resin film layer 2a has light-shielding ability.

Figure 3:
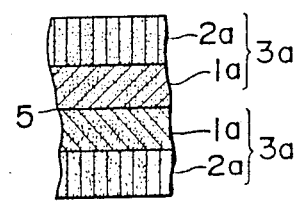

The packaging material of FIG. 3 is the same as the packaging material of FIG. 1, except that both of the inner layer 1a and the thermoplastic resin film layer 2a have light-shielding ability.

Figure 4:
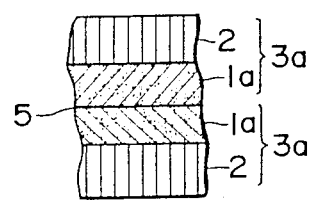

The packaging material of FIG. 4 is the same as the packaging material of FIG. 1, except that the inner layer 1a has light-shielding ability.

Figure 5:
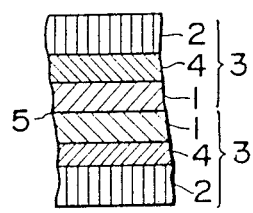

The packaging material of FIG. 5 is the same as the packaging material of FIG. 1, except that the coextruded multilayer inflation film 3 is a triple layer film where an intermediate layer 4 is incorporated.

Figure 6:
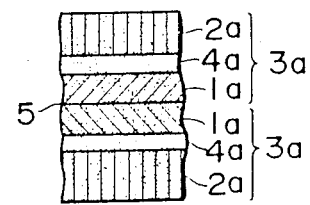

The packaging material of FIG. 6 is the same as the packaging material of FIG. 3, except that the coextruded multilayer inflation film 3a is a triple layer film where a light-shielding intermediate layer 4a is incorporated.

Figure 7:
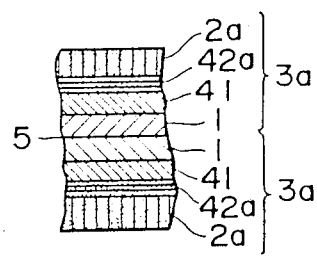
Figure 8:
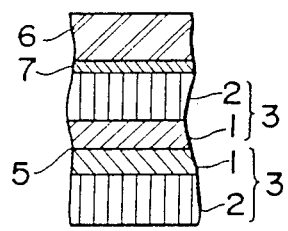
FIGS. 8 to 14 are partial sectional views of preferred embodiments having a light-reflective flexible sheet layer of the invention.

The packaging material of FIG. 7 is the same as the packaging material of FIG. 2, except that the coextruded multilayer inflation film 3a is a quadruple layer film with intermediate layer 41 located on the inside and on other intermediate layer 42a having light-shielding ability located on the outside.

The packaging materials of FIGS. 8 to 14 are formed by laminating the light-reflective flexible sheet layer 6 to the packaging material of FIGS. 1 to 7 through an adhesive layer 7, respectively.

EXAMPLES

EXAMPLES IN THE CASE OF L-LDPE RESIN FILM LAYER

Example I

The packaging material of Example I corresponds to the embodiment of FIG. 2.

The inner layer 1 is the L-LDPE resin film layer composed of 20% by weight of L-LDPE resin of which α-olefin is butene-1 having a density of 0.890 g/cm$^3$, a MI of 1.0 g/10 minutes and a Vicat softening point of 75 C, 79.7% by weight of L-LDPE resin of which α-olefin is 4-methylpentene-1 having a density of 0.920 g/cm$^3$, a MI of 2.1 g/10 minutes and a Vicat softening point of 100° C. and 0.3% by weight of antioxidant. The thickness of the inner layer 1 is 25 μm.

The thermoplastic resin film layer 2a is composed of 20% by weight of HDPE resin having a density of 0.954 g/cm$^3$, a MI of 1.1 g/10 minutes and a Vicat softening point of 126° C., 76.75% by weight of L-LDPE resin of which α-olefin is 4-methylpentene-1 having a density of 0.920 g/cm$^3$, a MI of 2.1 g/10 minutes and a Vicat softening point of 100° C., 3% by weight of carbon black and 0.05% by weight of oleic acid amide and 0.25% by weight of antioxidant. The thickness of the thermoplastic resin film layer 2a is 25 μm.

Example II

The packaging material of Example II corresponds to the embodiment of FIG. 3.

The inner layer 1 is the L LDPE resin film layer composed of 96.7% by weight of L-LDPE resin of which α-olefin is 4-methylpentene-1 having a density of 0.9111 g/cm$^3$, a MI of 2.0 g/10 minutes and a Vicat softening point of 88° C., 3% by weight of carbon black and 0.3% by weight of antioxidant, and its thickness is 25 μm.

The thermoplastic resin film layer 2a is the same as the packaging material of Example I.

Example III

The packaging material of Example III corresponds to the embodiment of FIG. 3.

The inner layer 1 is the L LDPE resin film layer composed of 96.7% by weight of L-LDPE resin of which α-olefin is 4-methylpentene-1 having a density of 0.910 g/cm$^3$, a MI of 3.5 g/10 minutes and a Vicat softening point of 86° C., 3% by weight of carbon black and 0.3% by weight of antioxidant, and its thickness is 25 μm.

The thermoplastic resin film layer 2a is the same as the packaging material of Example I.

Example IV

The packaging material of Example IV corresponds to the embodiment of FIG. 3.

The inner layer 1 is the L-LDPE resin film layer composed of 96.7% by weight of L-LDPE resin of which α-olefin is 4-methylpentene-1 having a density of 0.911 g/cm$^3$, a MI of 1.95 g/10 minutes and a Vicat softening point of 88° C. and 3% by weight of carbon black and 0.3% by weight of antioxidant, and its thickness is 30 μm.

The thermoplastic resin film layer 2a is composed of 5% by weight of LDPE resin having a density of 0.923 g/cm$^3$, a MI of 2.4 g/10 minutes and a Vicat softening point of 92° C., 91.75% by weight of HDPE resin having a density of 0.964 g/cm$^3$, a MI of 0.4 g/10 minutes and a Vicat softening point of 128° C. and 3% by weight of carbon black and 0.25% by weight of antioxidant, and its thickness is 20 μm.

Example V

The packaging material of Example V corresponds to the embodiment of FIG. 3.

The inner layer 1 is the L-LDPE resin film layer composed of 20% by weight of L-LDPE resin of which α-olefin is 4-methylpentene-1 having a density of 0.935 g/cm$^3$, a MI of 2.1 g/10 minutes and a Vicat softening point of 113° C., 76.65% by weight of L LDPE resin of which α-olefin is 4-methylpentene-1 having a density of 0.911 g/cm$^3$, a MI of 1.95 g/10 minutes and a Vicat softening point of 88° C., 3% by weight of carbon black and 0.05% by weight of oleic acid amide and 0.3% by weight of antioxidant, and its thickness is 25 μm.

The thermoplastic resin film layer 2a is the same as the packaging material of Example III.

COMPARATIVE EXAMPLE I

The packaging material of comparative Example I is a coextruded double layer film composed of the layer having the same resin composition as the L-LDPE resin film layer of Example IV and a thickness of 50 μm and the layer having the same resin composition as the thermoplastic resin film layer of Example IV and a thickness of 50 μm.

In this specification, MI, density and Vicat softening point were measured according to the following method, unless specifically mentioned.

MI (g/10 minutes); ASTM D-1238 (at 190° C.).
Density (g/cm³); ASTM D-1505.
Vicat Softening Point (°C.); ASTM D-1525.

Various properties of the above packaging materials were measured, and the results are summarized in Table 1.

TABLE 1

|  | Invention | | | | | Comparative |
|---|---|---|---|---|---|---|
|  | I | II | III | IV | V | I |
| Layer Composition | FIG. 2 | FIG. 3 | FIG. 3 | FIG. 3 | FIG. 3 | — |
| Inner Layer Thickness (μm) | 25 × 2 | 25 × 2 | 25 × 2 | 30 × 2 | 25 × 2 | 50 |
| Outer Layer Thickness (μm) | 25 × 2 | 25 × 2 | 25 × 2 | 20 × 2 | 25 × 2 | 50 |
| Smoothness | B | B | B | B | B | D-E |
| Curling | 0 (A) | 0 (A) | 0 (A) | 0 (A) | 0 (A) | 1.1 (C) |
| Film Moldability | B-C | B | B | B | B | D-E |
| Tear Strength MD (g) | >1600 | >1600 | >1600 | 847 | >1600 | 236 |
| Tear Strength CD (g) | >1600 | >1600 | >1600 | >1600 | >1600 | >1600 |
| Gelbo Test Strength (Times) | >300 | >300 | >300 | >300 | >300 | >300 |
| Bursting Strength (kg/cm²) | 2.28 | 2.60 | 2.32 | 2.57 | 2.78 | 2.62 |
| Static Friction Right (tan θ) Coefficient | 0.133 | 0.133 | 0.133 | 0.117 | 0.128 | 0.117 |
| Static Friction Reverse (tan θ) Coefficient | " | " | " | " | " | 1.600 |
| Impact Puncture Strength (kg · cm) | >30 | >30 | >30 | >30 | >30 | 23 |

Evaluations in Table 1 were carried out as follows:

| A | very excellent | B | excellent |
|---|---|---|---|
| C | practical | D | having a problem |
| E | impractical | | |

Testing methods were as follows:
Thickness; JIS P-8118.
Smoothness:
Each sample was molded using a simultaneously co-extruding double layer inflation molding machine, and the smoothness was judge by the degree melt fracture generation.
Curling:
Each test piece having a width of 80 cm and a length of 1 m was hung perpendicularly, and the curling was judge by the curling state of each test piece (Judged by the processibility for a processing machine).
Film Moldability:
Each sample was molded using a simultaneously co-extruding double layer inflation molding machine, and the film moldability was judged by current load, bubble stability, wrinkling and the like.
Tear strength; JIS P-8116.
Gelbo Test Strength; U.S. Military Standard MIL 131.
Bursting Strength; JIS P-8112.
Static Friction coefficient (Slip Angle):
A part of each exemplified film was cut off, and stuck on the underside of 75 mm length×35 mm width of a stainless steal block weighing 200 g by using a double face adhesive tape. Another part of the sample was stuck on an inclined face, and the above block was placed on the face. The inclined angle was increased, and the angle (θ) where the block began to slip was read. The coefficient is represented by the tangent.
Impact Puncture Strength; JIS P-8134.

Examples In The Case Of Ethylene-Acrylate Ester Copolymer Resin Film Layer

Example VI

The packaging material of Example VI corresponds to the embodiment of FIG. 2.

The inner layer 1 is the ethylene-acrylate ester copolymer resin film layer composed of 69.7% by weight of EEA resin of which the comonomer unit content is 18% by weight having a density of 0.93 g/cm³, a MI of 6 g/10 minutes and a Vicat softening point of 56° C., 30% by weight of L-LDPE resin of which α-olefin is octene-1 having a density of 0.920 g/cm³, a MI of 2 g/10 minutes and a Vicat softening point of 96° C. and 0.3% by weight of antioxidant, and its thickness is 25 μm.

The thermoplastic resin film layer 2a is composed of 20% by weight of HDPE resin having a density of 0.954 g/cm³, a MI of 1.1 g/10 minutes and a Vicat softening point of 126° C., 76.75% by weight of L LDPE resin of which α-olefin is 4-methylpentene-1 having a density of 0.920 g/cm³, a MI of 2.1 g/10 minutes and a Vicat softening point of 100° C., 3% by weight of carbon black and 0.05% by weight of oleic acid amide and 0.25% by weight of antioxidant, and its thickness is 25 μm.

Example VII

The packaging material of Example VII corresponds to the embodiment of FIG. 3.

The inner layer 1a is the ethylene acrylate ester copolymer resin film layer composed of 59.7% by weight of EEA resin of which the comonomer unit content is 10% by weight having a density of 0.93 g/cm³, a MI of 1.5 g/10 minutes and a Vicat softening point of 61° C., 38% by weight of L-LDPE resin of which α-olefin is butene-1 having a density of 0.890 g/cm³, a MI of 1 g/10 minutes and a Vicat softening point of 58° C. and 2% by weight of carbon black and 0.3% by weight of antioxidant, and its thickness is 25 μm.

The thermoplastic resin film layer 2a is the same as the packaging material of Example VI.

Example VIII

The packaging material of Example VIII corresponds to the embodiment of FIG. 3.

The inner layer 1a is the ethylene-acrylate ester copolymer resin film layer composed of 59.7% by weight of EEA resin of which the comonomer unit content is 20% by weight having a density of 0.93 g/cm³, a MI of 20 g/10 minutes and a Vicat softening point of 50° C., 37% by weight of L-LDPE resin and 3% by weight of carbon black and 0.3% by weight of antioxidant and its thickness is 25 μm.

The thermoplastic resin film layer 2a is the same as the packaging material of Example VI.

Example IX

The packaging material of Example IX corresponds to the embodiment of FIG. 3.

The inner layer 1a is the ethylene-acrylate ester copolymer resin film layer of which the resin composition is the same as the packaging material of Example VII, and its thickness is 30 μm.

The thermoplastic resin film layer 2a is composed of 5% by weight of LDPE resin having a density of 0.923 g/cm$^3$, a MI of 2.4 g/10 minutes and a Vicat softening point of 92° C., 91.75% by weight of HDPE resin having a density of 0.964 g/cm$^3$, a MI of 0.4 g/10 minutes and a Vicat softening point of 128° C. and 3% by weight of carbon black 0.25% by weight of antioxidant, and its thickness is 20 μm.

Example X

The packaging material of Example X corresponds to the embodiment of FIG. 3.

The inner layer 1a is the ethylene acrylate ester copolymer resin film layer composed of 59.7 % by weight of EEA resin of which the comonomer unit content is 20% by weight having a density of 0.93 g/cm$^3$, a MI of 20 g/10 minutes and a Vicat softening point of 50° C., 38% by weight of L-LDPE resin of which α-olefin is 4-methylpentene-1 having a density of 0.920 g/cm$^3$, a MI of 2.1 g/10 minutes and a Vicat softening point of 100° C. and 2% by weight of carbon black and 0.3% by weight of antioxidant, and its thickness is 25 μm.

The thermoplastic resin film layer 2a is the same as the packaging material of Example VIII.

Comparative Example II

The packaging material of Comparative Example II is a coextruded double layer film composed of the layer having the same resin composition as the ethylene-acrylate ester copolymer resin film layer of Example IX and a thickness of 50 μm and the layer having the same resin composition as the thermoplastic resin film layer of Example IX and a thickness of 50 μm.

Various properties of the above packaging materials were measured, and the results are summarized in Table 2.

ficient, and the angle (θ) where the block began to slip is written in Table 2 as the slip angle.

Examples In The Case Of Ethylene-Vinyl Acetate Copolymer Resin Film Layer

Example XI

The packaging material of Example XI corresponds to the embodiment of FIG. 2.

The inner layer 1 is the ethylene-vinyl acetate copolymer resin film layer composed of 69.7% by weight of EVA resin of which vinyl acetate unit content is 14% by weight (saponification method) having a MFR of 3.5 g/10 minutes, a density of 0.93 g/cm$^3$ and a Vicat softening point of 68° C. and 30% by weight of L LDPE resin of which α-olefin is octene-1 having a density of 0.920 g/cm$^3$, a MI of 2 g/10 minutes and a Vicat softening point of 96° C. and 0.3% by weight of antioxidant, and its thickness is 25 μm.

The thermoplastic resin film layer 2a is composed of 20% by weight of HDPE resin having a density of 0.954 g/cm$^3$, a MI of 1.1 g/10 minutes and a Vicat softening point of 126° C., 76.75% by weight of L-LDPE resin of which α-olefin is 4-methylpentene-1 having a density of 0.920 g/cm$^3$, 2.1 g/10 minutes and a Vicat softening point of 100° C., 3% by weight of carbon black and 0.05% by weight of oleic acid amide 0.25% by weight of antioxidant, and its thickness is 25 μm.

Example XII

The packaging material of Example XII corresponds to the embodiment of FIG. 3.

The inner layer 1a is the ethylene-vinyl acetate copolymer resin film layer composed of 59.7% by weight of EVA resin of which vinyl acetate unit content is 19% by weight (saponification method) having a MFR of 2.5 g/10 minutes, a density of 0.94 g/cm$^3$ and a Vicat softening point of 64° C., 38% by weight of L-LDPE resin of which α-olefin is butene-1 having a density of 0.890 g/cm$^3$, a MI of 1 g/10 minutes and a Vicat softening point of 58° C. and 2% by weight of carbon black and 0.3% by weight of antioxidant, and its thickness is 25 μm.

The thermoplastic resin film layer 2a is the same as the packaging material of Example XI.

Example XIII

The packaging material of Example XIII corresponds to the embodiment of FIG. 3.

The inner layer 1a is the ethylene-vinyl acetate copolymer resin film layer composed of 59.7% by weight

TABLE 2

|  | Invention | | | | | Comparative |
| --- | --- | --- | --- | --- | --- | --- |
|  | VI | VII | VIII | IX | X | II |
| Layer Composition | FIG. 2 | FIG. 3 | FIG. 3 | FIG. 3 | FIG. 3 | — |
| Inner Layer Thickness (μm) | 25 × 2 | 25 × 2 | 25 × 2 | 30 × 2 | 25 × 2 | 50 |
| Outer Layer Thickness (μm) | 25 × 2 | 25 × 2 | 25 × 2 | 20 × 2 | 25 × 2 | 50 |
| Smoothness | B | B | B | B | B | C-D |
| Curling | O (A) | O (A) | O (A) | O (A) | O (A) | 2.5 (D) |
| Film Moldability | B | B | B | B | B | C-D |
| Tear Strength MD (g) | 1385 | >1600 | >1600 | 603 | >1600 | 187 |
| Tear Strength CD (g) | >1600 | >1600 | >1600 | >1600 | >1600 | >1600 |
| Gelbo Test Strength (Times) | >300 | >300 | >300 | >300 | >300 |  |
| Slip Angle Reverse (degrees) | 11 | 11 | 11 | 9 | 10 | 9 |
| Slip Angle Right (degrees) | 11 | 11 | 11 | 9 | 10 | 58 |
| Impact Puncture Strength (kg · cm) | 28 | >30 | >30 | 25 | >30 | 19 |

In Table 2, the evaluations and the testing methods are the same as those in Table 1. The slip angle was measured in the same manner as the static friction coefficient of EVA resin of which vinyl acetate unit content is 14% by weight (saponification method) having a MFR of 1.4 g/10 minutes, a density of 0.93 g/cm³ and a Vicat softening point of 70° C. 37% by weight of L-LDPE resin of which α-olefin is butene-1 having a density of 0.906 g/cm³, a MI of 0.8 g/10 minutes and a Vicat softening MFR (g/10 minutes); ASTM D-1238 Modified.

Various properties of the above packaging materials were measured, and the results are summarized in Table 3.

TABLE 3

|  | Invention | | | | | Comparative |
|---|---|---|---|---|---|---|
|  | XI | XII | XIII | XIV | XV | III |
| Layer Composition | FIG. 2 | FIG. 3 | FIG. 3 | FIG. 3 | FIG. 3 | — |
| Inner Layer Thickness (μm) | 25 × 2 | 25 × 2 | 25 × 2 | 30 × 2 | 25 × 2 | 50 |
| Outer Layer Thickness (μm) | 25 × 2 | 25 × 2 | 25 × 2 | 20 × 2 | 25 × 2 | 50 |
| Smoothness | B | B | B | B | B | D-E |
| Curling | A | A | A | A | A | D-E |
| Film Moldability | B | B | B | B | B | D-E |
| Tear Strength MD (g) | >1600 | >1600 | >1600 | 723 | >1600 | 205 |
| Tear Strength CD (g) | >1600 | >1600 | >1600 | >1600 | >1600 | >1600 |
| Gelbo Test Strength (Times) | >300 | >300 | >300 | >300 | >300 | >300 |
| Slip Angle Reverse (degrees) | 11 | 11 | 11 | 9 | 10 | 9 |
| Slip Angle Right (degrees) | 11 | 11 | 11 | 9 | 10 | 78 |
| Impact Puncture Strength (kg · cm) | >30 | >30 | >30 | 28 | >30 | 21 | point of 84° C. and 3% by weight of carbon black and 0.3% by weight of antioxidant, and its thickness is 25 μm.

The thermoplastic resin film layer 2a is the same as the packaging material of Example XI.

EXAMPLE XIV

The packaging material of Example XIV corresponds to embodiment of FIG. 5.

The inner layer 1a is the ethylene-vinyl acetate copolymer resin film layer of which the resin composition is the same as the packaging material of Example XII, and its thickness is 30 μm.

The thermoplastic resin film layer 2a is composed of 5% by weight of LDPE resin having a density of 0.923 g/cm³, a MI of 2.4 g/10 minutes and a Vicat softening point of 92° C., 91.75% by weight of HDPE resin having a density of 0.964 g/cm³, a MI of 0.4 g/10 minutes and a Vicat softening point of 128° C. and 3% by weight of carbon black and 0.25% by weight of antioxidant, and its thickness is 20 μm.

Example XV

The packaging material of Example XV corresponds to the embodiment of FIG. 3.

The inner layer 1a is the ethylene-vinyl acetate copolymer resin film layer composed of 59.7% by weight of EVA resin of which vinyl acetate unit content is 19% by weight (saponification method) having a MFR of 2.5 g/10 minutes, a density of 0.94 g/cm³ and a Vicat softening point of 64° C., 38% by weight of L-LDPE resin of which α-olefin is 4-methylpentene-1 having a density of 0.920 g/cm³, a MI of 2.1 g/10 minutes and a Vicat softening point of 100° C. and 2% by weight of carbon black and 0.3% by weight of antioxidant, and its thickness is 25 μm.

The thermoplastic resin film layer 2a is the same as the packaging material of Example XI.

Comparative Example III

The packaging material of Comparative Example III is a coextruded double layer film composed of the layer having the same resin composition as the ethylene vinyl acetate copolymer resin film layer of Example XIV and a thickness of 50 μm and the layer having the same resin composition as the thermoplastic resin film layer of Example XIV and a thickness of 50 μm.

In this specification, MFR was measured according to the following method, unless specifically mentioned.

In Table 3, the evaluations and the testing methods are the same as those in Table 2.

Examples In The Case Of L-LDPE Resin Film Layer And Light-reflective Flexible Sheet Layer Laminated Thereto

Example XVI

Figure 9:
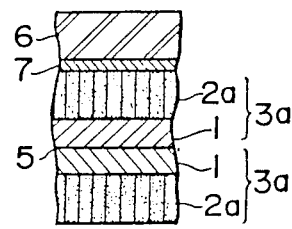

The packaging material of Example XVI corresponds to the embodiment of FIG. 9.

The L-LDPE resin film layer 1 and the thermoplastic resin film layer 2a are the same as Example I.

The light-reflective flexible sheet layer 6 consists of a biaxially stretched nylon film 15 μm thick and an aluminum membrane layer 400 Å thick formed by vacuum metallizing. The light reflective flexible sheet layer 6 is laminated so that the aluminum membrane layer is disposed on the side of thermoplastic resin film layer 2a through the adhesive layer 7 having a thickness of 15 μm consisting of LDPE resin having a MI of 5.1 g/10 minutes and a density of 0.919 g/cm³ formed by extrusion laminating.

Example XVII

Figure 10:
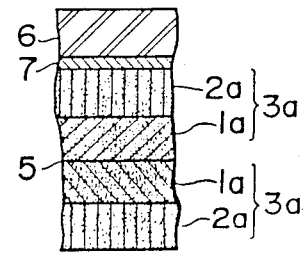
Figure 11:
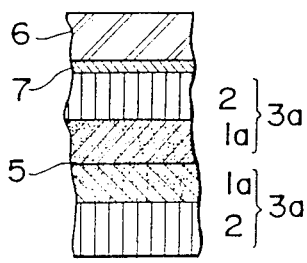
Figure 12:
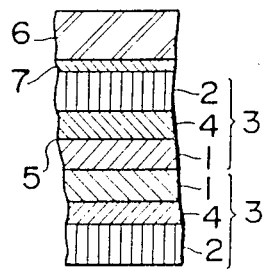
Figure 13:
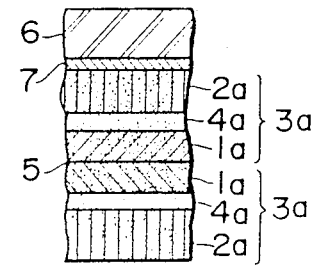
Figure 14:
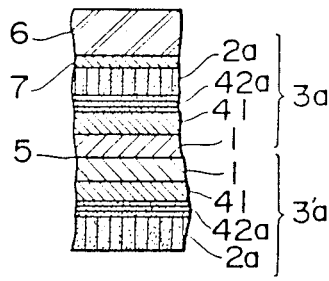

The packaging material of Example XVII corresponds to the embodiment of FIG. 10.

The L LDPE resin film layer 1a and the thermoplastic resin film layer 2a are the same as Example II.

The light-reflective flexible sheet layer 6 consists of a biaxially stretched polyester film 12 μm thick and an aluminum membrane layer 400 Å thick formed by metallizing. The light reflective flexible sheet layer 6 is laminated so that aluminum membrane layer is disposed on the side of thermoplastic resin film layer 2a through the same adhesive layer as employed in Example XVI.

Example XVIII

The packaging material of Example XVIII corresponds to the embodiment of FIG. 10.

The L-LDPE resin film layer 1a and the thermoplastic resin film layer 2a are the same as Example III.

The light-reflective flexible sheet layer 6 and the adhesive layer 7 are the same as Example XVI.

Example XIX

The packaging material of Example XIX corresponds to the embodiment of FIG. 10.

The L-LDPE resin film layer 1a and the thermoplastic resin film layer 2a are the same as Example IV.

The light-reflective flexible sheet layer 6 consists of a biaxially stretched polypropylene resin film 20 μm thick and an aluminum membrane layer 400 Å thick formed by vacuum metallizing. The light-reflective flexible sheet layer 6 is laminated so that aluminum membrane layer is disposed on the side of thermoplastic resin film layer 2a through the same adhesive layer as employed in Example XVI.

Example XX

The packaging material of Example XX corresponds to the embodiment of FIG. 10.

The L-LDPE resin film layer 1a and the thermoplastic resin film layer 2a are the same as Example V.

The light-reflective flexible sheet layer 6 consists of a diagonal unimolecular oriented HDPE resin film 35 μm thick having a density of 0.964 g/cm³ and a MI of 0.4 g/10 minutes and an aluminum membrane layer 400 Å thick formed by vacuum metallizing. The light-reflective flexible sheet layer 6 is laminated so that aluminum membrane layer is disposed on the side of thermoplastic resin film layer 2a through the same adhesive layer 7 as employed in Example XVI.

Comparative Example IV

The packaging material of Comparative Example IV is a coextruded double layer film composed of the layer having the same resin composition as the ethylene-vinyl acetate copolymer resin film layer of Example XIX and a thickness of 50 μm and the layer having the same resin composition as the thermoplastic resin film layer of Example XIX and a thickness of 50 μm, and the same light-reflective flexible sheet layer 6 as Example XIX through the same adhesive layer 7 as employed in Example XIX.

Various properties of the above packaging material were measured, and the results are summarized in Table 4.

The light-reflective flexible sheet layer 6 and the adhesive layer 7 are the same as Example XVI.

Example XXII

The packaging material of Example XXII corresponds to the embodiment of FIG. 10.

The ethylene-acrylate ester copolymer resin film layer 1a and the thermoplastic resin film layer 2a are the same as Example VII.

The light-reflective flexible sheet layer 6 and the adhesive layer 7 are the same as Example XVII.

Example XXIII

The packaging material of Example XXIII corresponds to the embodiment of FIG. 10.

The ethylene-acrylate ester copolymer resin film layer 1a and the thermoplastic resin film layer 2a are the same as Example VIII.

The light-reflective flexible sheet layer 6 and the adhesive layer 7 are the same as Example XVIII.

Example XXIV

The packaging material of Example XXIV corresponds to the embodiment of FIG. 10.

The ethylene-acrylate ester copolymer resin film layer 1a and the thermoplastic resin film layer 2a are the same as Example IX.

The light-reflective flexible sheet layer 6 and the adhesive layer are the same as Example XIX.

Example XXV

The packaging material of Example XXV corresponds to the embodiment of FIG. 10.

The ethylene-acrylate ester copolymer resin film layer 1a and the thermoplastic resin film layer 2a are the same as Example X.

The light-reflective flexible sheet layer 6 and the adhesive layer 7 are the same as Example XX.

TABLE 4

|  | Invention | | | | | Comparative |
|---|---|---|---|---|---|---|
|  | XVI | XVII | XVIII | XIX | XX | IV |
| Layer Composition | FIG. 9 | FIG. 10 | FIG. 10 | FIG. 10 | FIG. 10 | — |
| Light-Reflective Layer | Al-Nylon | Al-Poly. ester | Al-Nylon | Al-PP | Al-HDPE | Al-PP |
|  | 15 μm | 12 μm | 15 μm | 20 μm | 35 μm | 20 μm |
| Inner Layer Thickness (μm) | 25 × 2 | 25 × 2 | 25 × 2 | 30 × 2 | 25 × 2 | 50 |
| Outer Layer Thickness (μm) | 25 × 2 | 25 × 2 | 25 × 2 | 20 × 2 | 25 × 2 | 50 |
| Smoothness of Inflation Film | B | B | B | B | B | D-E |
| Curling | A | A | A | A | A | C |
| Moldability of Inflation Film | B-C | B | B | B | B | D-E |
| Tear Strength MD (g) | >1600 | >1600 | >1600 | 526 | >1600 | 196 |
| Tear Strength CD (g) | >1600 | >1600 | >1600 | >1600 | >1600 | >1600 |
| Gelbo Test Strength (Times) | >300 | >300 | >300 | >300 | >300 | >300 |
| Impact Puncture Strength (kg · cm) | >30 | >30 | >30 | >30 | >30 | 25 |

In Table 4, the evaluations and the testing methods are the same as Table 1.

Examples In The Case Of Ethylene-acrylate Ester Copolymer Resin Film Layer And Light-reflective Flexible Sheet Layer Laminated Thereto

Example XXI

The packaging material of Example XXI corresponds to the embodiment of FIG. 9.

The ethylene-acrylate ester copolymer resin film layer 1 and the thermoplastic resin film layer 2a are the same as Example VI.

Comparative Example V

The packaging material of Comparative Example V is a coextruded double layer film composed of the layer having the same resin composition as the ethylene-vinyl acetate copolymer resin film layer of Example XXIV and a thickness of 50 μm and the layer having the same resin composition as the thermoplastic resin film layer of Example XXIV and a thickness of 50 μm, and the same light-reflective flexible sheet layer 6 as Example XXIV through the same adhesive layer 7 as employed in Example XXIV.

Various properties of the above packaging material were measured, and the results are summarized in Table 5.

Example XXIX

The packaging material of Example XXIX corresponds to the embodiment of FIG. 10.

The ethylene-vinyl acetate copolymer resin film layer 1a and the thermoplastic resin film layer 2a are the same as Example XIV.

The light-reflective flexible sheet layer 6 and the adhesive layer are the same as Example XIX.

Example XXX

The packaging material of Example XXX corresponds to the embodiment of FIG. 10.

The ethylene-vinyl acetate copolymer resin film layer 1a and the thermoplastic resin film layer 2a are the same as Example XV.

The light-reflective flexible sheet layer 6 and the adhesive layer 7 are the same as Example XX.

Comparative Example V

The packaging material of Comparative Example V is a coextruded double layer film composed of the layer having the same resin composition as the ethylene-vinyl acetate copolymer resin film layer of Example XXIX and a thickness of 50 μm and the layer having the same resin composition as the thermoplastic resin film layer of Example XXIX and a thickness of 50 μm, and the same light-reflective flexible sheet layer 6 as Example XXIX through the same adhesive layer 7 as employed in Example XXIX.

Various properties of the above packaging material were measured, and the results are summarized in Table 6.

TABLE 5

|  | Invention | | | | | Comparative |
|---|---|---|---|---|---|---|
|  | XXI | XXII | XXIII | XXIV | XXV | V |
| Layer Composition | FIG. 9 | FIG. 10 | FIG. 10 | FIG. 10 | FIG. 10 | — |
| Light-Reflective Layer | Al-Nylon | Al-Polyester | Al-Nylon | Al-PP | Al-HDPE | Al-PP |
|  | 15 μm | 12 μm | 15 μm | 20 μm | 35 μm | 20 μm |
| Inner Layer Thickness (μm) | 25 × 2 | 25 × 2 | 25 × 2 | 30 × 2 | 25 × 2 | 50 |
| Outer Layer Thickness (μm) | 25 × 2 | 25 × 2 | 25 × 2 | 20 × 2 | 25 × 2 | 50 |
| Smoothness of Inflation Film | B | B | B | B | B | C-D |
| Curling | A | A | A | A | A | D-E |
| Moldability of Inflation Film | B | B | B | B | B | C-D |
| Tear Strength MD (g) | >1600 | >1600 | >1600 | 536 | >1600 | 213 |
| Tear Strength CD (g) | >1600 | >1600 | >1600 | >1600 | >1600 | >1600 |
| Gelbo Test Strength (Times) | >300 | >300 | >300 | >300 | >300 | >300 |
| Impact Puncture Strength (kg · cm) | >30 | >30 | >30 | 28 | >30 | 21 |

In Table 5, the evaluations and the testing methods are the same as Table 1.

Examples In The Case Of Ethylene-vinyl Acetate Copolymer Resin Film Layer And Light-reflective Flexible Sheet Layer Laminated Thereto

Example XXVI

The packaging material of Example XXVI corresponds to the embodiment of FIG. 9.

The ethylene-vinyl acetate copolymer resin film layer 1 and the thermoplastic resin film layer 2a are the same as Example XI.

The light-reflective flexible sheet layer 6 and the adhesive layer 7 are the same as Example XVI.

Example XXVII

The packaging material of Example XXVII corresponds to the embodiment of FIG. 10.

The ethylene-vinyl acetate copolymer resin film layer 1a and the thermoplastic resin film layer 2a are the same as Example XII.

The light-reflective flexible sheet layer 6 and the adhesive layer 7 are the same as Example XVII.

Example XXVIII

The packaging material of Example XXVIII corresponds to the embodiment of FIG. 10.

The ethylene-vinyl acetate copolymer resin film layer 1a and the thermoplastic resin film layer 2a are the same as Example XIII.

The light-reflective flexible sheet layer 6 and the adhesive layer are the same as Example XVIII.

TABLE 6

|  | Invention | | | | | Comparative |
|---|---|---|---|---|---|---|
|  | XXVI | XXVII | XXVIII | XXIX | XXX | VI |
| Layer Composition | FIG. 9 | FIG. 10 | FIG. 10 | FIG. 10 | FIG. 10 | — |
| Light-Reflective Layer | Al-Nylon | Al-Polyester | Al-Nylon | Al-PP | Al-HDPE | Al-PP |
|  | 15 μm | 12 μm | 15 μm | 20 μm | 35 μm | 20 μm |
| Inner Layer Thickness (μm) | 25 × 2 | 25 × 2 | 25 × 2 | 30 × 2 | 25 × 2 | 50 |
| Outer Layer Thickness (μm) | 25 × 2 | 25 × 2 | 25 × 2 | 20 × 2 | 25 × 2 | 50 |
| Smoothness of Inflation Film | B | B | B | B | B | D-E |
| Curling | A | A | A | A | A | D-E |
| Moldability of Inflation Film | B | B | B | B | B | D-E |
| Tear Strength MD (g) | >1600 | >1600 | >1600 | 673 | >1600 | 233 |
| Tear Strength CD (g) | >1600 | >1600 | >1600 | >1600 | >1600 | >1600 |
| Gelbo Test Strength (Times) | >300 | >300 | >300 | >300 | >300 | >300 |
| Impact Puncture Strength (kg · cm) | >30 | >30 | >30 | >30 | >30 | 23 |

In Table 6, the evaluations and the testing methods are the same as Table 1.

We claim:

1. A packaging material which comprises a pair of coextruded multilayer inflation film layer disposed symmetrically and joined through a pseudo-adhesive portion formed by blocking thereof wherein said multilayer inflation film layer comprises a linear low density polyethylene resin film layer containing more than 50% by weight of linear low density polyethylene resin having a density of less than 0.925 g/cm$^3$ and 0.01 to 2% by weight of an antioxidant disposed on the inside joined through a pseudo-adhesive portion formed by blocking and a thermoplastic resin film layer containing a substance having antiblocking activity disposed on the outside.

2. The packaging material of claim 1 wherein the Vicat softening point of said linear low density polyethylene resin is lower than 110° C.

3. A packaging material which comprises a pair of coextruded multilayer inflation film layers disposed symmetrically and joined through a pseudo-adhesive portion formed by blocking thereof wherein the inside layer of said multilayer inflation film layer joined through said pseudo-adhesive portion is an ethylene-acrylate ester copolymer resin film layer.

4. A packaging material which comprises a pair of coextruded multilayer inflation film layers disposed symmetrically and joined through a pseudo-adhesive portion formed by blocking thereof wherein said multilayer inflation film layer comprises an ethylene-acrylate ester copolymer resin film layer containing more than 50% by weight of an ethylene-acrylate ester copolymer resin of which the content of methylacrylate unit, ethylacrylate unit or a mixture thereof is more than 7% by weight and 0.01 to 2% by weight of an antioxidant disposed on the inside joined through a pseudo-adhesive portion formed by blocking and a thermoplastic resin film layer containing a substance having antiblocking activity disposed on the outside.

5. A packaging material which comprises a pair of coextruded multilayer inflation film layers disposed symmetrically and joined through a pseudo-adhesive portion formed by blocking thereof wherein the inside layer of said multilayer inflation film layer joined through said pseudo-adhesive portion is an ethylene-vinyl acetate copolymer resin film layer.

6. The packaging material of claim 1, claim 3 or claim 5 which further contains a light-reflective flexible sheet layer.

7. A packaging material which comprises a pair of coextruded multilayer inflation film layers disposed symmetrically and joined through a pseudo-adhesive portion formed by blocking thereof wherein said multilayer inflation film layer comprises an ethylene-vinyl acetate copolymer resin film layer containing more than 35% by weight of ethylene-vinyl acetate copolymer resin of which the content of vinyl acetate unit is more than 5% by weight disposed on the inside joined through a pseudo-adhesive portion formed by blocking and a thermoplastic resin film layer containing a substance having antiblocking activity disposed on the outside.

8. A packaging material which comprises a pair of coextruded multilayer inflation film layers disposed symmetrically and joined through a pseudo-adhesive portion formed by blocking thereof wherein the outer layer of said multilayer inflation film layer disposed on the outside of the pair of the multilayer inflation film layers is a heat-sealable thermoplastic resin film layer containing more than 10% by weight of an ethylene copolymer resin, a light-shielding material and a lubricant.

9. The packaging material of claim 8 wherein said thermoplastic resin film layer has a Vicat softening point higher than the inner layer by 5° C. or more.

10. The packaging material of claim 8 wherein said thermoplastic resin film layer has a slip angle of 6 to 60 degrees.

11. The packaging material of claim 8 wherein said thermoplastic resin film layer contains a substance having antiblocking activity.

12. The packaging material of claim 11 wherein said substance having antiblocking activity is a member selected from the group consisting of silica, diatomaceous earth, talc, calcium silicate, aluminum silicate, magnesium, silicate, calcium carbonate, polyvinyl esters of higher fatter acid, n-octadecylurea dicarboxylic acid ester amides, N,N',-dioleylhydroxyamido, and lubricants and light-shielding materials having antiblocking activity.

13. The packaging material of claim 11 wherein said substance having antiblocking activity is a member selected from the group consisting of carbon black, fatty acid amides, silica, talc, calcium carbonate, metal powder and titanium dioxide.

14. The packaging material of claim 6 wherein said light-reflective flexible sheet layer is a metallized flexible sheet layer.

15. The packaging material of claim 11 wherein said substance having antiblocking activity is more than 0.5% by weight of polyethylene resin having a density of more than 0.940 g/cm.

* * * * *